Jan. 4, 1966     A. PAIOLETTI ETAL     3,227,436

AUXILIARY SPRING CONSTRUCTION

Filed Aug. 2, 1962

INVENTOR,
Angelo F. Paioletti and
Edwin E. Musser,

BY M. E. Jones

ATTORNEY.

3,227,436
AUXILIARY SPRING CONSTRUCTION
Angelo F. Paioletti and Edwin E. Musser, both of 1330 N. Cameron St., Harrisburg, Pa.
Filed Aug. 2, 1962, Ser. No. 214,413
1 Claim. (Cl. 267—48)

My invention relates to an auxiliary spring construction for use on automotive vehicles and particularly those equipped with inboard type suspension springs so as to enhance the comfort of riding, levelling of the vehicle body, add carrying capacity and release pressure from the shackle bolts and rear suspension spring means.

A prime object is to provide a construction which is capable of being clamped in place at the zone of clamping of a vehicle suspension spring, and to bear with different selective degrees pressure against a vehicle part according to the degree of resilient support desired.

Another object is to provide a construction which is clamped or attached below longitudinally of and against a vehicle suspension spring, extends rearwardly, and includes a deflected portion of desired resilience to which a terminal means which contacts said spring is adjustable to be fastened in different selected positions, each of which effects a different degree of pressure support for the rear or portion of said spring between the rear axle and rear shackle.

Further an object is to provide the second form for attachment with minimum labor in that it will suspend and locate its attaching bolts through the act of positioning or installation on or adjustment and tightening of the nuts of the bolts to the vehicle.

Various additional objects and advantages will be in part be pointed out and otherwise become apparent from a consideration of the description following taken in connection with accompanying drawings illustrating an operative embodiment.

Figure 1:
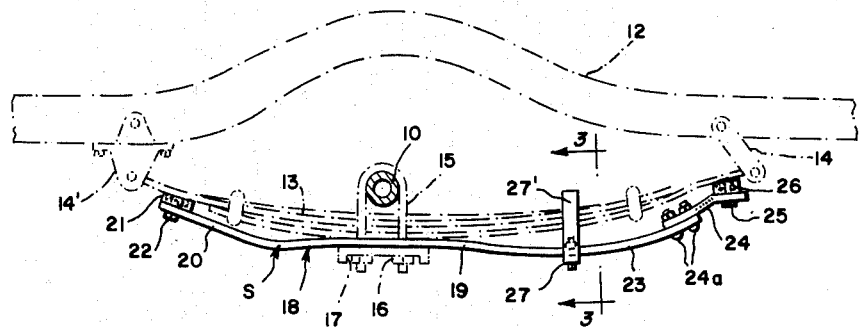
FIGURE 1 is a fragmentary side elevation illustrating in connection with vehicle fragments, one installation of my improved auxiliary spring construction.
Figure 2:
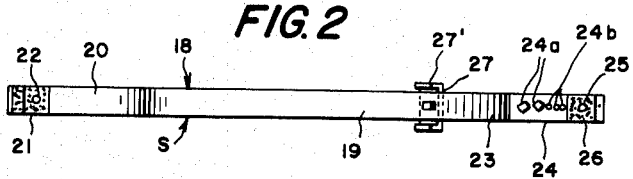
FIGURE 2 is a plan view of said auxiliary spring construction.
Figure 3:
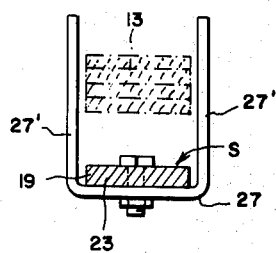
FIGURE 3 is an enlarged sectional detail taken on the line 3—3 of FIGURE 1.

Referring specifically to the drawing wherein like reference characters designate corresponding parts throughout the different views, representative parts of any suitable automotive vehicle are suggested by broken lines like the rear axle 10, side beam 12 of the chassis, laminated suspension spring structure 13, the rear securing shackle structure 14 and front securing bracket 14' for the latter. The usual spaced U-shaped securing bolts straddling the axle housing and located on opposite sides of spring 13 are shown at 15, the bolts passing through a plate 16 and being engaged from below by nuts 17. My spring structure, preferably metallic, is shown at S. It is to be understood that preferably two of such structures S are employed, one on each side at the rear end of an automotive vehicle and associated with an adjacent suspension spring thereof, but as they are duplicates in construction and mounting, an illustration and description of but one will suffice.

Said spring structure S may be made in the form of an elongated bar 18 which is to be removably clamped in place at a generally flat portion 19 intermediate its ends between said plate 16 and bottom of suspension spring 13. The front end portion 20 of bar 18 is inclined or deflected upwardly for contact at the desired tension against suspension spring 13, a rubber or other resilient bumper block 21 preferably being secured at 22 to bar 18 and interposed between the same and suspension spring 13.

The rear end portion 23 of bar 18 is downwardly deflected as for instance along a curve spaced from the suspension spring 13. Said portion 23 is equipped with a short adjustable end plate or arm 24 to which is secured at 25 a rubber or other resilient bumper block 26 which bears against suspension spring 13.

Since there is relative sliding movement in use between the distal terminals of spring S and plate 24, the said bumper blocks 21 and 26 act as silencers.

A bracket 27 is preferably carried by bar spring 23 having upstanding guide arms on opposite sides of suspension spring 13.

Figure 4:
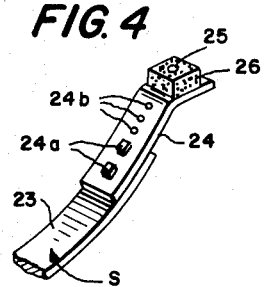
FIGURE 4 is a detail perspective view illustrating an adjustable rear end arm used on the auxiliary spring.
Figure 5:
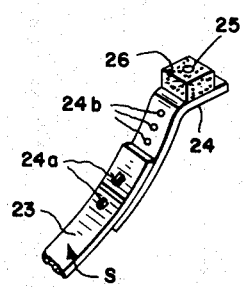
FIGURE 5 is a perspective view of the same parts of FIGURE 4 contrasting the selective positions of the extension arm, which may be secured either uppermost or lowermost with respect to the spring.

It is to be emphasized that the auxiliary spring S may be manufactured with the desired tension so that when the ends are in contact with the suspension spring the same will be reinforced, especially imparting resilient support to the vehicle the same or even greater than was true when the vehicle left the factory. To this end, especially deflected portion 23, is of such tension that in each position of adjustment at which arm or plate 24 may be secured by reason of bolts 24a as fastened in series of registrable openings 24b in both portion 23 and arm 24 a different degree of pressure is exerted against and supporting suspension spring 13. For examples, and in practice, with the plate or arm 24 uppermost as shown in FIGS. 1 and 4 there is a 60 lb. pressure created on suspension spring 13. By securing said plate or arm 24 lowermost as in FIGURE 5, the pressure drops to zero and only after the vehicle is loaded does resistance take place on suspension spring 13. Reverting to the FIG. 1 position of the parts, with the plate or arm 24 adjusted as permitted by the bolts 24a and bolt holes 24b to the left or rear axle 10 the resistance is materially increased, say an increase of 25 lbs. for each adjustment toward the left or rear axle. Use of bumpers 26 reduces the resistance of pressure about 15 lbs. in each position of adjustment. In substance, it will be seen that by adjusting plate or arm 24 to the left, that is toward the rear axle, will increase the resistance to the weight of the vehicle, while adjustment of said part away from said rear axle or toward the rear shackle 14' will reduce the resistance to weight.

What I claim is:

An auxiliary spring means for clamping below a suspension spring of a vehicle, said auxiliary spring means having silencers adapted to contact the suspension spring adjacent both ends and including a portion under predetermined stress extending toward the rear of said suspension spring and terminating in a distal end, the auxiliary spring means including an end part to bear against the under surface of said suspension spring, means to adjustably secure said end part longitudinally of said portion to said distal end in different positions so that the degree of resilient supporting pressure from said portion against said suspension spring may be varied, said auxiliary spring means also extending forwardly and at its forward end carrying one of said silencers to bear against said suspension spring, and said portion being downwardly deflected in order to prestress said auxiliary spring.

(References on following page)

References Cited by the Examiner

UNITED STATES PATENTS

| | | | |
|---|---|---|---|
| 2,650,817 | 9/1953 | Cover | 267—48 |
| 2,656,181 | 10/1953 | Hellwig | 267—48 |
| 2,798,736 | 7/1957 | Larkin | 267—41 |
| 2,861,798 | 11/1958 | Lenet et al. | 267—45 |
| 2,884,241 | 1/1959 | Farchmin | 267—48 |
| 2,928,669 | 3/1960 | Lenet | 267—48 |
| 2,951,696 | 9/1960 | Lenet | 267—45 |
| 2,954,970 | 10/1960 | Bernard et al. | 267—45 |
| 2,973,196 | 2/1961 | Scheublein et al. | 267—45 |
| 3,039,759 | 6/1962 | Paller | 267—48 |

ARTHUR L. LA POINT, *Primary Examiner.*

MILTON, KAUFMAN, *Examiner.*